United States Patent
Deng et al.

(10) Patent No.: US 12,406,984 B2
(45) Date of Patent: *Sep. 2, 2025

(54) SILICON-BASED ANODE MATERIAL, PREPARATION METHOD THEREFOR AND USE THEREOF IN LITHIUM-ION BATTERY

(71) Applicants: BTR NEW MATERIAL GROUP CO., LTD., Guangdong (CN); Dingyuan New Energy Technology Co., LTD., Guangdong (CN)

(72) Inventors: Zhiqiang Deng, Guangdong (CN); Chunlei Pang, Guangdong (CN); Jianguo Ren, Guangdong (CN); Youyuan Huang, Guangdong (CN)

(73) Assignees: BTR NEW MATERIAL GROUP CO., LTD., Shenzhen (CN); DINGYUAN NEW ENERGY TECHNOLOGY CO., LTD., Huizhou (CN)

( * ) Notice: Subject to any disclaimer, the term of this patent is extended or adjusted under 35 U.S.C. 154(b) by 389 days.

This patent is subject to a terminal disclaimer.

(21) Appl. No.: 18/048,812

(22) Filed: Oct. 21, 2022

(65) Prior Publication Data

US 2023/0106786 A1    Apr. 6, 2023

Related U.S. Application Data

(63) Continuation-in-part of application No. 16/760,579, filed as application No. PCT/CN2018/118102 on Nov. 29, 2018, now Pat. No. 11,515,530.

(30) Foreign Application Priority Data

Dec. 12, 2017 (CN) .......................... 201711321650.6

(51) Int. Cl.
*H01M 4/38* (2006.01)
*H01M 4/62* (2006.01)
(Continued)

(52) U.S. Cl.
CPC ........... *H01M 4/386* (2013.01); *H01M 4/622* (2013.01); *H01M 4/625* (2013.01);
(Continued)

(58) Field of Classification Search
CPC ...... H01M 4/386; H01M 4/366; H01M 4/622; H01M 4/624; H01M 4/625
See application file for complete search history.

(56) References Cited

U.S. PATENT DOCUMENTS

2017/0077497 A1* 3/2017 Ogata .................... H01M 4/587
2018/0287142 A1* 10/2018 Zhamu .................. H01M 4/366

FOREIGN PATENT DOCUMENTS

| CN | 102792498 A | 11/2012 |
| CN | 106058167 A | 10/2016 |

(Continued)

OTHER PUBLICATIONS

State Intellectual Property Office of the People's Republic of China, Office Action and Search Report Issued in Application No. 201711321650.6, Apr. 26, 2019, 11 pages. (Submitted with Partial Translation).

(Continued)

*Primary Examiner* — Christopher P Domone
(74) *Attorney, Agent, or Firm* — McCoy Russell LLP

(57) ABSTRACT

A silicon-based anode material, a preparation method therefor and a use thereof in a lithium-ion battery. The silicon-based anode material comprises a silicon-based active material and a composite layer that coats the surface of the silicon-based active material, wherein the composite layer comprises a flexible polymer, flake graphite and a conduc-
(Continued)

tive material. The preparation method according to the present application is simple, low cost, easy to be industrialized. The prepared silicon-based anode material has excellent electrochemical cycle performance and expansion inhibition and allows prolonged service life of lithium ion batteries.

18 Claims, 1 Drawing Sheet

(51) Int. Cl.
  *H01M 4/02* (2006.01)
  *H01M 10/0525* (2010.01)
(52) U.S. Cl.
  CPC ............ *H01M 2004/021* (2013.01); *H01M 2004/027* (2013.01); *H01M 10/0525* (2013.01)

(56) References Cited

FOREIGN PATENT DOCUMENTS

| CN | 106058209 A | 10/2016 |
|---|---|---|
| CN | 106207120 A | 12/2016 |
| CN | 107369835 A | 11/2017 |
| CN | 108054368 A | 5/2018 |
| JP | 2009224239 A | 10/2009 |
| JP | 2013522820 A | 6/2013 |
| JP | 2015053165 A | 3/2015 |
| JP | 2016157652 A | 9/2016 |
| JP | 2016213183 A | 12/2016 |
| JP | 2017088437 A | 5/2017 |
| JP | 2017182989 A | 10/2017 |
| JP | 2020510960 A | 4/2020 |
| KR | 20150063620 A | 6/2015 |
| KR | 20160033639 A | 3/2016 |
| KR | 20170033123 A | 3/2017 |
| WO | 2015005117 A1 | 1/2015 |
| WO | 2015073674 A1 | 5/2015 |
| WO | WO2015073674 * | 5/2015 |

OTHER PUBLICATIONS

Japanese Patent Office, Office Action Issued in Application No. 2019-544835, Sep. 23, 2020, 6 pages. (Submitted with Machine Translation).
European Patent Office, Extended European Search Report Issued in Application No. 18889184.0, Jul. 30, 2021, Germany, 18 pages.
Korean Intellectual Property Office, Office Action Issued in Application No. 10-2020-7018652, Apr. 12, 2022, 13 pages.
Japanese Patent Office, Notice of Allowance Issued in Application No. 2021-127006, Nov. 1, 2022, 5 pages.
Korean Intellectual Property Administration, Office Action Issued in Application No. 10-2022-7044110, Jan. 30, 2023, 17 pages.

* cited by examiner

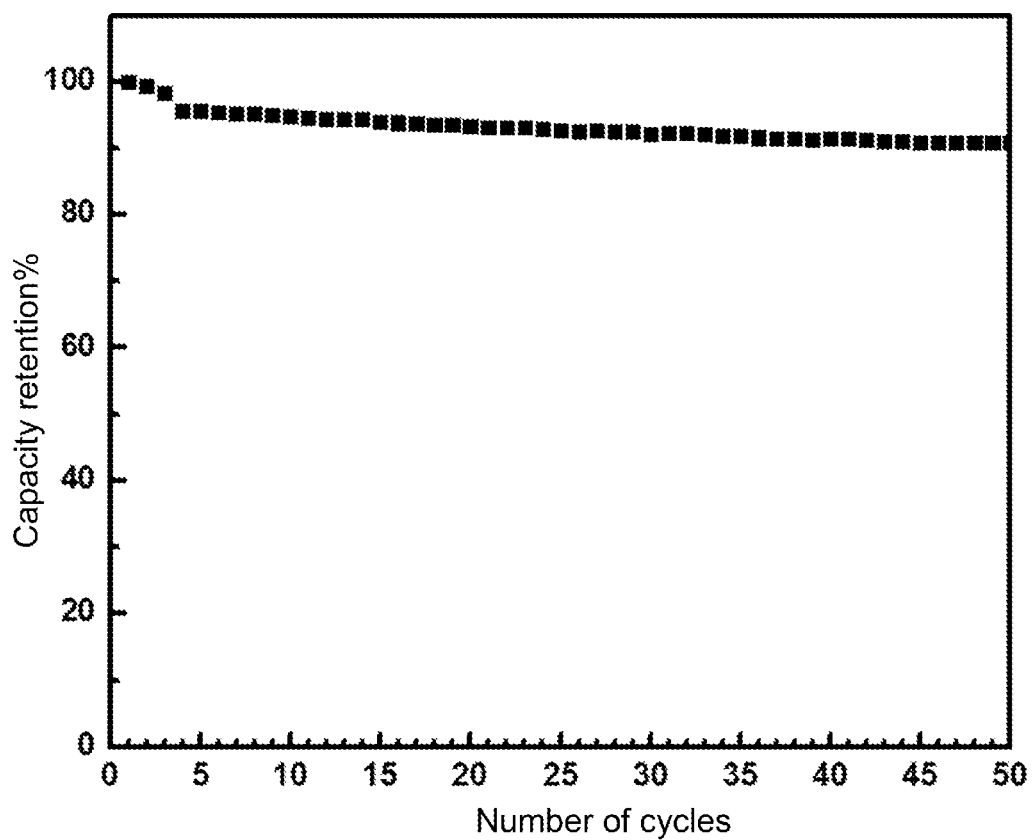

SILICON-BASED ANODE MATERIAL, PREPARATION METHOD THEREFOR AND USE THEREOF IN LITHIUM-ION BATTERY

CROSS-REFERENCE TO RELATED APPLICATIONS

The present application is a continuation-in-part of U.S. patent application Ser. No. 16/760,579, entitled "SILICON-BASED NEGATIVE ELECTRODE MATERIAL, PREPARATION METHOD THEREFOR AND USE THEREOF IN LITHIUM-ION BATTERY", and filed on Apr. 30, 2020. U.S. patent application Ser. No. 16/760,579 claims priority to International Application No. PCT/CN2018/118102, entitled "SILICON-BASED NEGATIVE ELECTRODE MATERIAL, PREPARATION METHOD THEREFOR AND USE THEREOF IN LITHIUM-ION BATTERY" and filed on Nov. 29, 2018. International Application No. PCT/CN2018/118102 claims priority to Chinese Patent Application No. 201711321650.6 filed on Dec. 12, 2017. The contents of each of the above-listed applications are hereby incorporated by reference for all purposes.

TECHNICAL FIELD

The present application relates to the field of lithium ion batteries, and to a silicon-based anode material, a preparation method and a use thereof, particularly to a silicon-based anode material, a preparation method thereof and a use thereof in lithium ion batteries.

BACKGROUND

With the development of lithium ion batteries toward large-scale application fields, performance indexes such as energy density and power density of the lithium ion batteries are required to be further improved. In regard to anode materials, traditional graphite carbon anode materials, having limited specific capacity (372 mAh/g), has been difficult to meet the demands of batteries with high energy density. Therefore, anode materials with high specific capacity have become the current research focus. Silicon-based material is of great interest due to its theoretical specific capacity of up to 4,200 mAh/g. However, severe volume effect and poor conductivity result in low reversible capacity and poor cycle stability of silicon anode material. In order to solve the above-mentioned problems of the silicon-based material, researchers have conducted a great deal of experimental studies, such as conductive polymer coating, carbon coating, compounding with metal oxides, nanocrystallization and porosification.

For instance, patent CN 106229495 A discloses a conductive polymer coated silicon-based anode material and preparation method thereof, with the technical key points comprising: a silicon-based material is coated with a conductive polymer (polythiophene, polyaniline and polypyrrole) through in-situ polymerization, sodium alginate is added to enhance stability, and a three-dimensional network structure is constructed for buffering expansion of silicon material. However, the conductive polymer coated by this method has low conductivity and also unstable conductivity, and is prone to dedoping to lose conductivity, resulting in reduced cycle performance of the material, and the preparation process by in-situ polymerization is complicated. CN 105186003 A discloses a method for preparing anode material of lithium ion battery with high capacity, which comprises: a polymer, a conductive agent and a non-carbon anode material are dispersed into a suitable solvent to form a uniform emulsion, then freezing or spray drying are conducted to obtain a uniform black powder material, and vacuum drying is conducted to obtain a conductive polymer coated high-capacity anode material. Wherein, the volume change of the non-carbon anode during cycling is optimized by utilizing the polymer. However, in the material prepared by this method, the conductive agent which is dispersed around the active material will lose its connection with the active material during cycling, moreover, the polymer has relatively low strength and has failed to improve the expansion of the non-carbon anode material effectively.

Hence, it is still a technical puzzle in the art to develop a silicon anode material having excellent cycle performance and low volume expansion effect as well as a preparation method thereof.

SUMMARY

For the above problems in the prior art, the present application aims to provide a silicon-based anode material, preparation method thereof and use thereof in lithium ion batteries. The silicon-based anode material according to the present application has excellent electrochemical cycle performance and expansion inhibition and allows prolonged service life of lithium ion batteries. The preparation method according to the present application has a simple and effective process, which is also low cost, easy to be industrialized and green and environment-friendly.

In order to achieve the above-mentioned purposes, the present application adopts the following technical solutions.

In a first aspect, the present application provides a silicon-based anode material, which comprises a silicon-based active material and a composite layer coated on the surface of the silicon-based active material, where the composite layer comprises a flexible polymer and a conductive material, wherein, the conductive material comprises flake graphite and a nano-carbon based material.

In the above solution, the composite layer coats on the surface of the silicon-based active material, where the flake graphite is integrally attached to the surface of the silicon-based active material, the flexible polymer having high strength is coated on the surface of the silicon-based active material and of the flake graphite, and the region that is not attached and coated is filled by nano-carbon based material. The combination of the three materials mentioned-above together constitutes the composite layer, and the synergistic effect of the three materials is capable of inhibiting the expansion of silicon-based material more effectively. Moreover, the silicon-based anode material obtained by coating as mentioned above has high electric conductivity and high conductivity stability. Accordingly, the silicon-based anode material provided by the present application is particularly suitable for lithium ion batteries, and possesses excellent cyclic expansion performance.

Certainly, it noted that in order to satisfy other use requirements of the product, the surface of the silicon-based active material may further contain other substances, such as oxides, nitrides, metal salts, metal hydroxides or other compounds. The oxide, for example, may be any one of aluminum oxide, lithium oxide, magnesium oxide and phosphorus oxide; The nitride may be at least one of lithium nitride, aluminum nitride and boron nitride; The metal salt may be at least one of lithium phosphate, aluminum phosphate, aluminum metaphosphate, magnesium phosphate, magnesium metaphosphate, lithium aluminate, magnesium silicate, lithium silicate, aluminum silicate and sodium silicate; The metal hydroxide, for example, may be at least one of aluminum hydroxide and magnesium hydroxide; The other compounds, for example, may be lithium fluoride and lithium carbonate; and there is no limitation here. Only several substances that can be coated on the surface of the silicon-based active material are exemplarily listed above. Actually, according to other requirements of those skilled in the art for the performance of the silicon-based anode material, other material can be added, as long as the electrochemical cycle and the ability to inhibit expansion are within an acceptable range.

In a feasible embodiment, the silicon-based active material has a particle size of 0.5 μm to 100 μm, e.g. 0.5 μm, 2 μm, 5 μm, 10 μm, 25 μm, 35 μm, 50 μm, 70 μm, 80 μm, 90 μm or 100 μm, and the like, and there is no limitation here.

The silicon-based active material comprises any one of Si, $SiO_x$, or a silicon alloy, or a combination of at least two thereof, wherein $0<x\leq2$. But it is not limited to the above-listed silicon-based active materials, other silicon-based active materials commonly used in the art, such as carbon-coated silicon oxides, may also be used in the present application.

In a feasible embodiment, the composite layer has a thickness of 10 nm to 100 nm, e.g. 10 nm, 20 nm, 30 nm, 45 nm, 60 nm, 70 nm, 80 nm, 85 nm, 90 nm, 95 nm or 100 nm, and the like, and there is no limitation here.

In a feasible embodiment, the flexible polymer includes a natural flexible polymer and/or a synthetic flexible polymer.

In a feasible embodiment, the flexible polymer includes any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof.

Optionally, the "natural flexible polymer and/or synthetic flexible polymer" as used herein refers to a natural flexible polymer, a synthetic flexible polymer, or a mixture of a natural flexible polymer and a synthetic flexible polymer.

Typical but non-limiting examples of the combinations of the flexible polymers include: a combination of polyolefin and polyvinyl alcohol, a combination of polyvinyl alcohol and carboxymethyl cellulose, a combination of carboxymethyl cellulose and alginic acid, a combination of polyamide and derivatives of carboxymethyl cellulose, a combination of polyolefin, derivatives of polyolefin, and polyacrylic acid, a combination of polyvinyl alcohol, derivatives of polyamide, and alginic acid, a combination of polyolefin, polyvinyl alcohol, derivatives of polyacrylic acid, polyamide and alginic acid, and the like.

Optionally, the flexible polymer includes polyolefin and derivatives thereof, or a combination of polyolefin and derivatives thereof with alginic acid and derivatives thereof.

Optionally, the flexible polymer has a weight average molecular weight of 2,000-1,000,000, e.g. 2,000, 5,000, 10,000, 15,000, 20,000, 30,000, 40,000, 50,000, 60,000, 75,000, 100,000, 200,000, 300,000, 350,000, 400,000, 500,000, 600,000, 650,000, 700,000, 800,000, 900,000 or 1,000,000 and the like, and preferably 100,000-500,000.

In a feasible embodiment, the flexible polymer contains a crosslinking functional group, and the crosslinking functional group comprises any one of epoxy group, carboxyl group, hydroxyl group, amino group, double bond or triple bond, or a combination of at least two thereof. Understandably, crosslinking (also known as crosslinking reaction) refers to the reaction of two or more molecules bonding and crosslinking with each other to form a more stable molecule (body molecule) with network structure. The crosslinking reaction can be classified into physical crosslinking, chemical crosslinking, etc. according to the trigger factors, and there is no limitation here.

Optionally, the flexible polymer contains a thermal crosslinking functional group (also referred to as a thermally crosslinkable functional group), and the thermal crosslinking functional group comprises any one of epoxy, carboxyl, hydroxyl, amino, double bond or triple bond, or a combination of at least two thereof. Understandably, the thermal crosslinking functional group undergoes crosslinking reaction as being heated to a certain temperature.

Optionally, the flake graphite includes natural flake graphite and/or synthetic flake graphite.

The "natural flake graphite and/or synthetic flake graphite" described herein may refers to natural flake graphite, synthetic flake graphite or a mixture of natural flake graphite and synthetic flake graphite.

Optionally, the conductive material is a combination of flake graphite and a nano-carbon based material. In the case where the conductive material is just totally a mixture of these two materials, the two materials are better allowed to cooperate with the silicon-based composite material to play a role in inhibiting the expansion of the silicon-based material, which further improves the conductivity and the conductive stability.

Optionally, the nano-carbon based material comprises any one of conductive graphite, graphene, carbon nanotubes or carbon nanofibers, or a combination of at least two thereof.

In a feasible embodiment, the conductive material may further include conductive metal, conductive alloy, and the like. The conductive metal, for example, may be copper, aluminum, silver, gold, etc., and the conductive alloy, for example, may be copper zinc alloy, copper aluminum alloy, titanium zinc alloy, aluminum copper zinc alloy, etc. Understandably, when the conductive material includes these above metal substances, the composite layer coated on the surface of the silicon-based active material would also be doped with these metal substances, thereby further improving the conductivity.

Optionally, based on the total mass of the silicon-based active material being 100%, the flexible polymer is present in an amount of 0-10% by mass, exclusive of 0, e.g. 0.5%, 1%, 1.5%, 2%, 3%, 4%, 5%, 6.5%, 8%, 9% or 10% and the like, and preferably 3-7%.

Optionally, based on the total mass of the silicon-based active material being 100%, the flake graphite is present in an amount of 0-20% by mass, exclusive of 0, e.g. 0.5%, 1%, 3%, 3.5%, 5%, 6%, 8%, 10%, 12%, 13%, 15%, 16%, 18% or 20% and the like, and preferably 5-10%.

Optionally, based on the total mass of the silicon-based active material being 100%, the nano-carbon based material is present in an amount of 0-5% by mass, exclusive of 0, e.g. 0.5%, 1%, 2%, 2.5%, 3%, 4% or 5% and the like, and preferably 1-3%.

Optionally, a contact angle of the material is test by the Washburn method. The contact angle of the silicon-based anode material is ≤60°. The material with the above contact angle has good hydrophilicity. When preparing a water-based slurry, the material has good dispersion and can be made into a pole piece with good uniformity, thus improving the cycle stability of the battery.

In a second aspect, the present application provides a silicon-based anode material which comprises a silicon-based active material, a conductive material and a flexible polymer, where the conductive material and the flexible polymer coat on the surface of the silicon-based active material, and where the conductive material comprises flake graphite and a nano-carbon based material.

In the above solution, the flake graphite is integrally attached to the surface of the silicon-based active material, the flexible polymer having high strength is coated on the surface of the silicon-based active material and of the flake graphite, and the region that is not attached and coated is filled by nano-carbon based material. The combination of the three materials mentioned-above together constitutes the composite layer, and the synergistic effect of the three materials is capable of inhibiting the expansion of silicon-based material more effectively. Moreover, the silicon-based anode material obtained by coating as mentioned above has high electric conductivity and high conductivity stability. Accordingly, the silicon-based anode material provided by the present application is particularly suitable for lithium ion batteries, and possesses excellent cyclic expansion performance.

Certainly, it noted that in order to satisfy other use requirements of the product, the surface of the silicon-based active material may further contain other substances, such as oxides, nitrides, metal salts, metal hydroxides or other compounds. The oxide, for example, may be any one of aluminum oxide, lithium oxide, magnesium oxide and phosphorus oxide; The nitride may be at least one of lithium nitride, aluminum nitride and boron nitride; The metal salt may be at least one of lithium phosphate, aluminum phosphate, aluminum metaphosphate, magnesium phosphate, magnesium metaphosphate, lithium aluminate, magnesium silicate, lithium silicate, aluminum silicate and sodium silicate; The metal hydroxide, for example, may be at least one of aluminum hydroxide and magnesium hydroxide; The other compounds, for example, may be lithium fluoride and lithium carbonate; and there is no limitation here. Only several substances that can be coated on the surface of the silicon-based active material are exemplarily listed above. Actually, according to other requirements of those skilled in the art for the performance of the silicon-based anode material, other material can be added, as long as the electrochemical cycle and the ability to inhibit expansion are within an acceptable range.

In a feasible embodiment, the silicon-based active material has a particle size of 0.5 μm to 100 μm, e.g. 0.5 μm, 2 μm, 5 μm, 10 μm, 25 μm, 35 μm, 50 μm, 70 μm, 80 μm, 90 μm or 100 μm, and the like, and there is no limitation here.

The silicon-based active material comprises any one of Si, $SiO_x$, or a silicon alloy, or a combination of at least two thereof, wherein $0<x\leq2$. But it is not limited to the above-listed silicon-based active materials, other silicon-based active materials commonly used in the art, such as carbon-coated silicon oxides, may also be used in the present application.

In a feasible embodiment, the flexible polymer includes a natural flexible polymer and/or a synthetic flexible polymer.

In a feasible embodiment, the flexible polymer includes any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof.

Optionally, the "natural flexible polymer and/or synthetic flexible polymer" as used herein refers to a natural flexible polymer, a synthetic flexible polymer, or a mixture of a natural flexible polymer and a synthetic flexible polymer.

Typical but non-limiting examples of the combinations of the flexible polymers include: a combination of polyolefin and polyvinyl alcohol, a combination of polyvinyl alcohol and carboxymethyl cellulose, a combination of carboxymethyl cellulose and alginic acid, a combination of polyamide and derivatives of carboxymethyl cellulose, a combination of polyolefin, derivatives of polyolefin, and polyacrylic acid, a combination of polyvinyl alcohol, derivatives of polyamide, and alginic acid, a combination of polyolefin, polyvinyl alcohol, derivatives of polyacrylic acid, polyamide and alginic acid, and the like.

Optionally, the flexible polymer includes polyolefin and derivatives thereof, or a combination of polyolefin and derivatives thereof with alginic acid and derivatives thereof.

Optionally, the flexible polymer has a weight average molecular weight of 2,000-1,000,000, e.g. 2,000, 5,000, 10,000, 15,000, 20,000, 30,000, 40,000, 50,000, 60,000, 75,000, 100,000, 200,000, 300,000, 350,000, 400,000, 500,000, 600,000, 650,000, 700,000, 800,000, 900,000 or 1,000,000 and the like, and preferably 100,000-500,000.

In a feasible embodiment, the flexible polymer contains a crosslinking functional group, and the crosslinking functional group comprises any one of epoxy group, carboxyl group, hydroxyl group, amino group, double bond or triple bond, or a combination of at least two thereof. Understandably, crosslinking (also known as crosslinking reaction) refers to the reaction of two or more molecules bonding and crosslinking with each other to form a more stable molecule (body molecule) with network structure. The crosslinking reaction can be classified into physical crosslinking, chemical crosslinking, etc. according to the trigger factors, and there is no limitation here.

Optionally, the flexible polymer contains a thermal crosslinking functional group (also referred to as a thermally crosslinkable functional group), and the thermal crosslinking functional group comprises any one of epoxy, carboxyl, hydroxyl, amino, double bond or triple bond, or a combination of at least two thereof. Understandably, the thermal crosslinking functional group undergoes crosslinking reaction as being heated to a certain temperature.

Optionally, the flake graphite includes natural flake graphite and/or synthetic flake graphite.

The "natural flake graphite and/or synthetic flake graphite" described herein may refers to natural flake graphite, synthetic flake graphite or a mixture of natural flake graphite and synthetic flake graphite.

Optionally, the conductive material is a combination of flake graphite and a nano-carbon based material. In the case where the conductive material is just totally a mixture of these two materials, the two materials are better allowed to cooperate with the silicon-based composite material to play a role in inhibiting the expansion of the silicon-based material, which further improves the conductivity and the conductive stability.

Optionally, the nano-carbon based material comprises any one of conductive graphite, graphene, carbon nanotubes or carbon nanofibers, or a combination of at least two thereof.

In a feasible embodiment, the conductive material may further include conductive metal, conductive alloy, and the like. The conductive metal, for example, may be copper, aluminum, silver, gold, etc., and the conductive alloy, for example, may be copper zinc alloy, copper aluminum alloy, titanium zinc alloy, aluminum copper zinc alloy, etc. Understandably, when the conductive material includes these above metal substances, the composite layer coated on the surface of the silicon-based active material would also be doped with these metal substances, thereby further improving the conductivity.

Optionally, based on the total mass of the silicon-based active material being 100%, the flexible polymer is present in an amount of 0-10% by mass, exclusive of 0, e.g. 0.5%, 1%, 1.5%, 2%, 3%, 4%, 5%, 6.5%, 8%, 9% or 10% and the like, and preferably 3-7%.

Optionally, based on the total mass of the silicon-based active material being 100%, the flake graphite is present in an amount of 0-20% by mass, exclusive of 0, e.g. 0.5%, 1%, 3%, 3.5%, 5%, 6%, 8%, 10%, 12%, 13%, 15%, 16%, 18% or 20% and the like, and preferably 5-10%.

Optionally, based on the total mass of the silicon-based active material being 100%, the nano-carbon based material is present in an amount of 0-5% by mass, exclusive of 0, e.g. 0.5%, 1%, 2%, 2.5%, 3%, 4% or 5% and the like, and preferably 1-3%.

Optionally, a contact angle of the material is test by the Washburn method. The contact angle of the silicon-based anode material is ≤60°. The material with the above contact angle has good hydrophilicity. When preparing a water-based slurry, the material has good dispersion and can be made into a pole piece with good uniformity, thus improving the cycle stability of the battery.

In a third aspect, the present application provides a silicon-based anode material which comprises a silicon-based active material, a conductive material and a flexible polymer, where the conductive material comprises flake graphite and a nano-carbon based material;

the surface of the silicon-based active material attaches with the flake graphite and the nano-carbon based material;

the flexible polymer is bonded between the flake graphite and the nano-carbon based material and/or the flexible polymer is coated on the surface of the flake graphite.

In the above solution, the surface of the silicon-based active material attaches with the flake graphite and the nano-carbon based material, which is capable of effectively improving the conductivity of the anode material. Moreover, through the bonding of flexible polymers, a stable coating structure is formed, which can effectively inhibit the expansion of the silicon-based material.

Understandably, the above attaching can be the direct contact of the flake graphite and the nano-carbon based material with the silicon-based active material, adsorbing on the surface of it, or can be the adhesion of flake graphite and the nano-carbon based material on the surface of the silicon-based active material through an adhesive material, or can be the covalent bond connection formed by surface modification.

In a feasible embodiment, the flake graphite is integrally attached to the surface of the silicon-based active material.

It noted that the above attaching refers to that the side of flake graphite with relatively larger cross-sectional area faces or backs to the silicon-based active material, attaching to the surface of the silicon-based active material.

Optionally, the nano-carbon based material fills the region on the surface of the silicon-based active material that is not attached by the flake graphite.

In the above solution, the expansion of the silicon-based active material can be effectively inhibited through the combined effect of the flake graphite integrally attached to the surface of the silicon-based active material, the polymer having high strength coated on the surface of the silicon-based active material and the nano-carbon based material filled in the gaps. In addition, by the attaching of flake graphite and filling the gaps by the nano-carbon based material, the prepared coated silicon-based anode material has excellent performances. And the cyclic expansion inhibition property of the silicon-based active material is improved significantly and the service life of the lithium ion batteries is prolonged via the combined effect of flake graphite attaching, flexible polymer coating and nano-carbon based material filling.

In a feasible embodiment, the flake graphite is uniformly distributed on the surface of the silicon-based active material.

Optionally, the flake graphite, the nano-carbon based material and the flexible polymer form a continuous coating layer.

The nano-carbon based material can effectively facilitates the flake graphite and the flexible polymer to form a continuous and complete coating layer on the surface of the silicon-based active material. The coating layer has higher strength, which can effectively inhibit the expansion of the silicon-based active material. Moreover, the continuous and complete coating layer can inhibit side reaction of between the silicon-based active material and electrolyte, and can also improve the cycling performance of the anode material.

Certainly, it noted that in order to satisfy other use requirements of the product, the surface of the silicon-based active material may further contain other substances, such as oxides, nitrides, metal salts, metal hydroxides or other compounds. The oxide, for example, may be any one of aluminum oxide, lithium oxide, magnesium oxide and phosphorus oxide; The nitride may be at least one of lithium nitride, aluminum nitride and boron nitride; The metal salt may be at least one of lithium phosphate, aluminum phosphate, aluminum metaphosphate, magnesium phosphate, magnesium metaphosphate, lithium aluminate, magnesium silicate, lithium silicate, aluminum silicate and sodium silicate; The metal hydroxide, for example, may be at least one of aluminum hydroxide and magnesium hydroxide; The other compounds, for example, may be lithium fluoride and lithium carbonate; and there is no limitation here. Only several substances that can be coated on the surface of the silicon-based active material are exemplarily listed above. Actually, according to other requirements of those skilled in the art for the performance of the silicon-based anode material, other material can be added, as long as the electrochemical cycle and the ability to inhibit expansion are within an acceptable range.

In a feasible embodiment, the silicon-based active material has a particle size of 0.5 μm to 100 μm, e.g. 0.5 μm, 2 μm, 5 μm, 10 μm, 25 μm, 35 μm, 50 μm, 70 μm, 80 μm, 90 μm or 100 μm, and the like, and there is no limitation here.

The silicon-based active material comprises any one of Si, $SiO_x$, or a silicon alloy, or a combination of at least two thereof, wherein 0<x≤2. But it is not limited to the above-listed silicon-based active materials, other silicon-based active materials commonly used in the art, such as carbon-coated silicon oxides, may also be used in the present application.

In a feasible embodiment, the composite layer has a thickness of 10 nm to 100 nm, e.g. 10 nm, 20 nm, 30 nm, 45 nm, 60 nm, 70 nm, 80 nm, 85 nm, 90 nm, 95 nm or 100 nm, and the like, and there is no limitation here.

In a feasible embodiment, the flexible polymer includes a natural flexible polymer and/or a synthetic flexible polymer.

In a feasible embodiment, the flexible polymer includes any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof.

Optionally, the "natural flexible polymer and/or synthetic flexible polymer" as used herein refers to a natural flexible polymer, a synthetic flexible polymer, or a mixture of a natural flexible polymer and a synthetic flexible polymer.

Typical but non-limiting examples of the combinations of the flexible polymers include: a combination of polyolefin and polyvinyl alcohol, a combination of polyvinyl alcohol and carboxymethyl cellulose, a combination of carboxymethyl cellulose and alginic acid, a combination of polyamide and derivatives of carboxymethyl cellulose, a combination of polyolefin, derivatives of polyolefin, and polyacrylic acid, a combination of polyvinyl alcohol, derivatives of polyamide, and alginic acid, a combination of polyolefin, polyvinyl alcohol, derivatives of polyacrylic acid, polyamide and alginic acid, and the like.

Optionally, the flexible polymer includes polyolefin and derivatives thereof, or a combination of polyolefin and derivatives thereof with alginic acid and derivatives thereof.

Optionally, the flexible polymer has a weight average molecular weight of 2,000-1,000,000, e.g. 2,000, 5,000, 10,000, 15,000, 20,000, 30,000, 40,000, 50,000, 60,000, 75,000, 100,000, 200,000, 300,000, 350,000, 400,000, 500,000, 600,000, 650,000, 700,000, 800,000, 900,000 or 1,000,000 and the like, and preferably 100,000-500,000.

In a feasible embodiment, the flexible polymer contains a crosslinking functional group, and the crosslinking functional group comprises any one of epoxy group, carboxyl group, hydroxyl group, amino group, double bond or triple bond, or a combination of at least two thereof. Understandably, crosslinking (also known as crosslinking reaction) refers to the reaction of two or more molecules bonding and crosslinking with each other to form a more stable molecule (body molecule) with network structure. The crosslinking reaction can be classified into physical crosslinking, chemical crosslinking, etc. according to the trigger factors, and there is no limitation here.

Optionally, the flexible polymer contains a thermal crosslinking functional group (also referred to as a thermally crosslinkable functional group), and the thermal crosslinking functional group comprises any one of epoxy, carboxyl, hydroxyl, amino, double bond or triple bond, or a combination of at least two thereof. Understandably, the thermal crosslinking functional group undergoes crosslinking reaction as being heated to a certain temperature.

Optionally, the flake graphite includes natural flake graphite and/or synthetic flake graphite.

The "natural flake graphite and/or synthetic flake graphite" described herein may refers to natural flake graphite, synthetic flake graphite or a mixture of natural flake graphite and synthetic flake graphite.

Optionally, the conductive material is a combination of flake graphite and a nano-carbon based material. In the case where the conductive material is just totally a mixture of these two materials, the two materials are better allowed to cooperate with the silicon-based composite material to play a role in inhibiting the expansion of the silicon-based material, which further improves the conductivity and the conductive stability.

Optionally, the nano-carbon based material comprises any one of conductive graphite, graphene, carbon nanotubes or carbon nanofibers, or a combination of at least two thereof.

In a feasible embodiment, the conductive material may further include conductive metal, conductive alloy, and the like. The conductive metal, for example, may be copper, aluminum, silver, gold, etc., and the conductive alloy, for example, may be copper zinc alloy, copper aluminum alloy, titanium zinc alloy, aluminum copper alloy, etc. Understandably, when the conductive material includes these above metal substances, the composite layer coated on the surface of the silicon-based active material would also be doped with these metal substances, thereby further improving the conductivity.

Optionally, based on the total mass of the silicon-based active material being 100%, the flexible polymer is present in an amount of 0-10% by mass, exclusive of 0, e.g. 0.5%, 1%, 1.5%, 2%, 3%, 4%, 5%, 6.5%, 8%, 9% or 10% and the like, and preferably 3-7%.

Optionally, based on the total mass of the silicon-based active material being 100%, the flake graphite is present in an amount of 0-20% by mass, exclusive of 0, e.g. 0.5%, 1%, 3%, 3.5%, 5%, 6%, 8%, 10%, 12%, 13%, 15%, 16%, 18% or 20% and the like, and preferably 5-10%.

Optionally, based on the total mass of the silicon-based active material being 100%, the nano-carbon based material is present in an amount of 0-5% by mass, exclusive of 0, e.g. 0.5%, 1%, 2%, 2.5%, 3%, 4% or 5% and the like, and preferably 1-3%.

Optionally, a contact angle of the material is test by the Washburn method. The contact angle of the silicon-based anode material is ≤60°. The material with the above contact angle has good hydrophilicity. When preparing a water-based slurry, the material has good dispersion and can be made into a pole piece with good uniformity, thus improving the cycle stability of the battery.

In a fourth aspect, the present application provides a preparation method of the silicon-based anode material, which comprises the following steps:

dissolving a flexible polymer in a solvent to obtain a flexible polymer solution;

adding a conductive material comprising flake graphite and a nano-carbon based material to the flexible polymer solution under stirring to obtain a mixed coating solution;

adding an anti-solvent to the mixed coating solution and stirring, to obtain a supersaturated mixed coating solution;

under stirring, adding a silicon-based active material to the supersaturated mixed coating solution, followed by stirring and separating, to obtain an anode material precursor; and subjecting the anode material precursor to heat treatment to obtain a silicon-based anode material.

According to the method of the present application, the silicon-based active material is dispersed in the supersaturated solution of the flexible polymer in which the flake graphite and the nano-carbon based material are dispersed, thus the flexible polymer is gradually coated on the surface of the silicon-based active material by utilizing the properties of the supersaturated solution, while the flake graphite and the conductive material dispersed in the solution are attached to the surface of the silicon-based active material by virtue of the traction and binding effects of the flexible polymer.

In the silicon-based anode material prepared by the method according to the present application, the excellent adhesiveness of the flake graphite and the function of filling the gaps by the nano-carbon based material are utilized, so that the coated material has a stable structure, high conductivity and high conductivity stability.

As an preferable technical solution of the method according to the present application, the flexible polymer contains a thermal crosslinking functional group, which thermal crosslinking functional group comprises any one of epoxy, carboxyl, hydroxyl, amino, double bond or triple bond, or a combination of at least two thereof. In the preferable technical solution, the flexible polymer contains a large number of crosslinkable functional groups which is subjected to crosslinking in subsequent heat treatment so that the strength of the coating layer is enhanced to inhibit the expansion of the material during cycling.

Optionally, the solvent in includes any one of water, methanol, ethanol, polypyrrolidone, isopropanol, acetone, petroleum ether, tetrahydrofuran, ethyl acetate, N,N-dimethylacetamide, N,N-dimethylformamide, n-hexane, or a halogenated hydrocarbon, or a combination of at least two thereof.

Optionally, after dissolving the flexible polymer in the solvent, stirring is carried out at 25° C. to 100° C., e.g. 25° C., 30° C., 40° C., 50° C., 60° C., 70° C., 80° C., 90° C. or 100° C., and the like.

Optionally, the conductive material is a combination of the flake graphite and the nano-carbon based material. In the case where the conductive material is just totally a mixture of these two materials, the two materials are better allowed to cooperate with the silicon-based composite material to play a role in inhibiting the expansion of the silicon-based material, which further improves the conductivity and the conductive stability.

Optionally, the conductive material may further include conductive metal, metal oxides, metal salts, conductive alloy, and the like. The conductive metal, for example, may be copper, aluminum, silver, gold, etc.; the metal oxides, for example, may be lithium oxide, aluminum oxide, iron oxide, etc.; the metal salts, for example, may be lithium fluoride, lithium phosphate, lithium aluminate, etc.; and the conductive alloy, for example, may be copper zinc alloy, copper aluminum alloy, titanium zinc alloy, aluminum copper zinc alloy, etc. Understandably, when the conductive material includes these above metal substances, the composite layer coated on the surface of the silicon-based active material would also be doped with these metal substances, thereby further improving the conductivity.

Optionally, after adding the conductive material comprising the flake graphite and the nano-carbon based material in the flexible polymer solution, stirring is continued for 2 h to 4 h, e.g. 2 h, 2.5 h, 3 h, 3.5 h or 4 h, and the like.

Optionally, the anti-solvent is a poor solvent for the flexible polymer, and selected from any one of water, methanol, ethanol, polypyrrolidone, isopropanol, acetone, petroleum ether, tetrahydrofuran, ethyl acetate, N,N-dimethylacetamide, N,N-dimethylformamide, n-hexane, or a halogenated hydrocarbon, or a combination of at least two thereof.

Optionally, the stirring duration is 1 h to 2 h, e.g. 1 h, 1.2 h, 1.5 h, 1.6 h, 1.8 h or 2 h, and the like.

Optionally, after adding the silicon-based active material to the supersaturated mixed coating solution, stirring is carried out at 25° C. to 80° C. for 2 h to 4 h. The stirring temperature is, e.g. 25° C., 30° C., 40° C., 45° C., 50° C., 60° C., 70° C. or 80° C., and the like; and the stirring duration is, e.g. 2 h, 2.5 h, 3 h, 3.2 h, 3.5 h or 4 h, and the like.

Optionally, the separation mode comprises any one of atmospheric pressure filtration, reduced pressure filtration or centrifugation; but is not limited to the above-mentioned separation modes, and other separation modes commonly used in the art to achieve the same effect can also be used in the present application.

Optionally, the heat treatment temperature is 100° C. to 400° C., e.g. 100° C., 125° C., 150° C., 170° C., 200° C., 220° C., 240° C., 260° C., 300° C., 350° C. or 400° C., and the like, preferably 150° C. to 250° C.

Optionally, the heat treatment duration is 2 h to 12 h, e.g. 2 h, 4 h, 5 h, 6.5 h, 8 h, 10 h, 11 h or 12 h, and the like.

In the method according to the present application, the anode material precursor is a silicon-based material coated by the conductive material and the flexible polymer together, and after the heat treatment, the flexible polymer is crosslinked via the crosslinkable groups, so that the strength of the coating layer is enhanced to inhibit the expansion of the material during cycling.

As a further preferable technical solution of the method according to the present application, the method comprises the following steps:

dissolving a flexible polymer containing a thermal crosslinking functional group in a solvent and stirring at 25° C. to 100° C., to obtain a flexible polymer solution is obtained;

adding flake graphite and a nano-carbon based material to the flexible polymer solution under stirring, and after the addition is finished, stirring for 2 h to 4 h, to obtain a mixed coating solution;

adding an anti-solvent to the mixed coating solution, and stirring for 1 h to 2 h, to obtain a supersaturated mixed coating solution;

under stirring, adding a silicon-based active material to the supersaturated mixed coating solution, and then stirring at 25° C. to 80° C. for 2 h to 4 h, separating, to obtain an anode material precursor; and subjecting the anode material precursor to heat treatment at 150° C. to 250° C. for 2 h to 12 h to obtain a silicon-based anode material;

wherein, the anti-solvent is a poor solvent for the flexible polymer containing a thermal crosslinking functional group.

In a fifth aspect, the present application provides an anode comprising the silicon-based anode material according to the first aspect.

In a sixth aspect, the present application provides a lithium ion battery comprising the anode according to the third aspect.

As compared to the related art, the present application has the following beneficial effects:

According to the present application, polymer precipitates are coated on the silicon-based active material by utilizing the properties of the supersaturated solution of the polymer, while the flake graphite is firmly attached to the surface of a silicon-based active material and nano-carbon based materials are firmly filled in gaps by virtue of the traction and binding effects of the polymer, maintaining the electric connection in the cyclic expansion process of the silicon-based active material. The expansion of the silicon-based active material can be effectively inhibited through the combined effect of the flake graphite integrally attached to the surface of the silicon-based active material, the polymer having high strength coated on the surface of the silicon-based active material and the nano-carbon based material filled in the gaps. In addition, by the attaching of flake graphite and filling the gaps by the nano-carbon based material, the prepared coated silicon-based anode material has excellent performances and is extremely suitable for lithium ion batteries, and has high conductivity and high conductivity stability. And the cyclic expansion inhibition property of the silicon-based active material is improved significantly and the service life of the lithium ion batteries is prolonged via the combined effect of flake graphite attaching, flexible polymer coating and nano-carbon based material filling.

The preparation method according to the present application has advantages of inexpensive raw materials, simple and effective process, mild conditions, low requirements on equipment, low cost and easy large-scale production. Furthermore, the production process is green and environment-friendly with no toxic and harmful intermediate product being generated in the process.

Certainly, it noted that in order to satisfy other use requirements of the product, the mixed coating solution may further contain other substances, such as oxides, nitrides, metal salts, metal hydroxides or other compounds. The oxide, for example, may be any one of aluminum oxide, lithium oxide, magnesium oxide and phosphorus oxide; The nitride may be at least one of lithium nitride, aluminum nitride and boron nitride; The metal salt may be at least one of lithium phosphate, aluminum phosphate, aluminum metaphosphate, magnesium phosphate, magnesium metaphosphate, lithium aluminate, magnesium silicate, lithium silicate, aluminum silicate and sodium silicate; The metal hydroxide, for example, may be at least one of aluminum hydroxide and magnesium hydroxide; The other compounds, for example, may be lithium fluoride and lithium carbonate; and there is no limitation here. Only several substances that can be coated on the surface of the silicon-based active material are exemplarily listed above. Actually, according to other requirements of those skilled in the art for the performance of the silicon-based anode material, other material can be added, as long as the electrochemical cycle and the ability to inhibit expansion are within an acceptable range.

BRIEF DESCRIPTION OF THE DRAWINGS

In order to more clearly describe the embodiments of the present application or the technical solution of the prior art, the following will briefly introduce the drawings needed to be used in the embodiments or the prior technical description. Obviously, the drawing in the following description is only an embodiment of the present application. For ordinary technicians in the art, they can also obtain other drawings based on these drawings without paying creative labor.

FIG. 1 is a graph showing the capacity retention after 50 cycles of a battery prepared by the silicon-based anode material for lithium ion batteries obtained in Example 3 of the present application.

DESCRIPTION OF EMBODIMENTS

The examples of the present application is described in detail below with reference to accompanying drawing in order to more clearly explain the technical solutions of the present application.

It should be noted that the described examples are only part of the embodiments of the present application, rather than all of them. Based on the examples in the present application, all other embodiments obtained by those ordinary skilled in the art without doing creative work also belong to the protection scope of the present application.

The terms used in the embodiments of the present application are only for the purpose of describing specific examples, and are not intended to limit the present application. The singular forms of "a", "said" and "the" used in the embodiments of the present application and the appended claims are also intended to include the plurality form, unless the context clearly indicates other meanings.

It should be understood that the term "and/or" used herein is only a relationship describing association of object, indicating that there can be three relationships. For example, "A and/or B" can indicate three cases: A alone, A and B together, and B alone. In addition, the character "/" herein generally indicates an "or" relationship for the association object.

The present application is described in detail below with reference to specific embodiments and accompanying drawings in order to more clearly explain the purposes, technical solutions and technical effects of the present application.

Example 1

Provided in this example is a silicon-based anode material for lithium ion batteries, which was prepared by the following method:

4 g of polyacrylic acid was dissolved in 100 g of distilled water for sufficiently dissolving at 40° C., then 1 g of carbon nanofibers and 5 g of flake graphite CSG-3 were added thereinto under stirring; after stirring for 2 hours, 200 g of ethanol was added, followed by further stirring for 0.5 hour; thereafter, 90 g of $SiO_x$ (x=1.0) was added thereinto under stirring; after stirring at 60° C. for 2 hours, the mixture was cooled to room temperature, and separated by suction filtration to obtain a material; then the material was placed in a drying oven at 180° C. for heat treatment for 4 hours, and then cooled and taken out, thereby a corresponding $SiO_x$ anode material coated with polyacrylic acid, CSG-3 and carbon nanofibers was obtained, which was the silicon-based anode material for lithium ion batteries.

Example 2

Provided in this example is a silicon-based anode material for lithium ion batteries, which was prepared by the following method:

2.5 g of polyacrylic acid was dissolved in 100 g of distilled water for sufficiently dissolving at 40° C., then 0.5 g of carbon nanotubes and 3 g of flake graphite CSG-3 were added thereinto under stirring; after stirring for 4 hours, 200 g of ethanol was added, followed by further stirring for 0.5 hour; thereafter, 95 g of $SiO_x/C$ (x=1.0) was added thereinto under stirring; after stirring at 60° C. for 2 hours, the mixture was cooled to room temperature, and separated by suction filtration to obtain a material; then the material was placed in a drying oven at 180° C. for heat treatment for 4 hours, and then cooled and taken out, thereby a corresponding $SiO_x/C$ anode material coated with polyacrylic acid, CSG-3 and carbon nanotubes was obtained, which was the silicon-based anode material for lithium ion batteries.

Example 3

Provided in this example is a silicon-based anode material for lithium ion batteries, which was prepared by the following method:

2 g of polyacrylic acid and 1 g of sodium carboxymethylcellulose were dissolved in 100 g of distilled water for sufficiently dissolving at 50° C., then 1 g of graphene and 3 g of flake graphite CSG-3 were added thereinto; after stirring for 4 hours, 200 g of methanol was added, followed by further stirring for 1 hour; thereafter, 90 g of $SiO_x/C$ (x=1.0) was added thereinto; after stirring at 50° C. for 4 hours, the mixture was cooled to room temperature, and separated by centrifugation to obtain a material; then the material was placed in a drying oven at 250° C. for heat treatment for 4 hours, and then cooled and taken out, thereby a corresponding $SiO_x/C$ anode material coated with polyacrylic acid-sodium carboxymethylcellulose, CSG-3 and graphene was obtained, which was the silicon-based anode material for lithium ion batteries.

FIG. 1 is a graph showing the capacity retention after 50 cycles of a battery prepared by the silicon-based anode material for lithium ion batteries obtained in this example, and it can be seen from the graph that the capacity retention after 50 cycles of the battery reached 91.2%.

Example 4

Provided in this example is a silicon-based anode material for lithium ion batteries, which was prepared by the following method:

3 g of polyvinyl alcohol was dissolved in 100 g of distilled water for sufficiently dissolving at 90° C., then 1 g of carbon nanotubes and 5 g of flake graphite CSG-3 were added thereinto under stirring; after stirring for 2.5 hours, 100 g of acetone was added, followed by further stirring for 2 hour; thereafter, 100 g of $SiO_x/C$ (x=1.0) was added thereinto under stirring; after stirring at 80° C. for 2.5 hours, the mixture was cooled to room temperature, and separated by suction filtration to obtain a material; then the material was placed in a drying oven at 200° C. for heat treatment for 6 hours, and then cooled and taken out, thereby a corresponding silicon-based anode material for lithium ion batteries was obtained.

Example 5

5 g of alginic acid was dissolved in 150 g of distilled water for sufficiently dissolving at 60° C., then 2 g of conductive graphite and 2 g of flake graphite CSG-3 were added thereinto under stirring; after stirring for 3 hours, 200 g of ethanol was added followed by further stirring for 1.5 hour; thereafter, 100 g of $SiO_x$ (x=1.0) was added thereinto under stirring; after stirring at 35° C. for 4 hours, the mixture was cooled to room temperature, and separated by suction filtration to obtain a material; then the material was placed in a drying oven at 100° C. for heat treatment for 12 hours, and then cooled and taken out, thereby a corresponding silicon-based anode material for lithium ion batteries was obtained.

Example 6

4 g of polyamide was dissolved in a mixed solution of 80 g of ethanol and 20 g of isopropyl alcohol for sufficiently dissolving at 50° C., then 0.5 g of carbon nanofibers and 3 g of flake graphite CSG-3 were added thereinto under stirring; after stirring for 3.5 hours, 150 g of petroleum ether was added, followed by further stirring for 1.5 hour; thereafter, 100 g of $SiO_x/C$ (x=1.0) was added thereinto under stirring; after stirring at 80° C. for 2 hours, the mixture was cooled to room temperature, and separated by suction filtration to obtain a material; then the material was placed in a drying oven at 375° C. for heat treatment for 2 hours, and then cooled and taken out, thereby a corresponding silicon-based anode material for lithium ion batteries was obtained.

Comparative Example 1

A $SiO_x/C$ anode material, where x=1.0.

Comparative Example 2

Conducted as Example 1, but without adding carbon nanofibers.

Comparative Example 3

Conducted as Example 1, but without adding flake graphite.

The anode materials prepared in Examples 1-6 were applied to lithium ion batteries, with Serial No. SI-1, SI-2, SI-3, SI-4, SI-5, and SI-6, respectively. As a control, a lithium ion battery was prepared using $SiO_x/C$ (x=1.0) of Comparative Example 1 as the anode material, numbered Ref-1; a lithium ion battery was prepared using the material without adding carbon nanofibers of Comparative Example 2 as the anode material, numbered Ref-2; and a lithium ion battery was prepared the material without adding flake graphite of Comparative Example 3 as the anode material, numbered Ref-3.

Test method of the contact angle: Washburn test method is employed. During the test, n-hexane is used as a test liquid to measure the capillary constant after powder filling; then using the same filling method to fill the powder to test the contact angle of the material using acetone as the test liquid.

The anode materials prepared in Examples 1-6 and the $SiO_x/C$ (x=1.0) of the reference were mixed with sodium carboxymethylcellulose, styrene butadiene rubber, conductive graphite (KS-6) and carbon black (SP) in a ratio of 92:2:2:2:2, respectively, to prepare a slurry; each slurry was uniformly coated on a copper foil and dried to prepare an anode plate. The appearance of the pole piece were observed and recorded. A button cell was assembled by using the anode plate in an glove box under argon atmosphere, where the separator used was a polypropylene microporous membrane, the electrolyte used was 1 mol/L of lithium hexafluorophosphate (the solvent was a mixed liquor of ethylene carbonate, ethyl methyl carbonate and dimethyl carbonate), and the counter electrode used was a metallic lithium sheet.

A test for 50 cycles was performed on the 4 groups of batteries, wherein the voltage range was 0.005 V-1.5 V, and the current density was set to be 50 mA/g. And the capacity retentions were calculated after the cycle test, and the lithium ion batteries were disassembled for measuring the thicknesses of the anode plates.

Wherein, capacity retention after 50 cycles=discharge capacity at the 50th cycle/discharge capacity at the first cycle*100%, and the results are shown in Table 1; expansion rate of anode electrode plate in thickness after 50 cycles= (thickness after 50 cycles−thickness of uncharged electrode plate)/thickness of uncharged electrode plate*100%, and the results are shown in Table 1.

TABLE 1

Capacity retention and expansion rate of electrode plate of each battery after 50 cycles

| Serial No. | appearance of the pole piece | contact angle | Capacity retention after 50 cycles (%) | Expansion rate of electrode plate after 50 cycles (%) |
|---|---|---|---|---|
| SI-1 | uniform and smooth | 35° | 90.3 | 39.2 |
| SI-2 | uniform and smooth | 59° | 90.7 | 38.5 |
| SI-3 | uniform and smooth | 49° | 91.2 | 37.7 |
| SI-4 | uniform and smooth | 44° | 90.8 | 37.9 |
| SI-5 | uniform and smooth | 22° | 89.3 | 39.5 |
| SI-6 | uniform and smooth | 41° | 90.1 | 38.3 |

TABLE 1-continued

Capacity retention and expansion rate of electrode plate of each battery after 50 cycles

| Serial No. | appearance of the pole piece | contact angle | Capacity retention after 50 cycles (%) | Expansion rate of electrode plate after 50 cycles (%) |
|---|---|---|---|---|
| Ref-1 | rough particles | 75° | 85.6 | 45.4 |
| Ref-2 | uniform and smooth | 32° | 86.5 | 43.1 |
| Ref-3 | uniform and smooth | 33° | 87.3 | 44.5 |

From the test results in Table 1, with respect to the batteries where the silicon-based material for lithium ion batteries according to the present application was used as the anode active material, the capacity retention and the expansion rate of electrode plate after 50 cycles were both significantly improved, which indicates that the silicon-based material for lithium ion batteries provided by the present application is capable of inhibiting effectively the expansion of the electrode plate and the exfoliation of the active material during electrochemical cycling, thereby significantly improving the cycle performance of lithium ion batteries.

In the above Examples and Comparative Examples, compared with Comparative Example 1, the SiOx/C material in Example 1 was coated with polymer and conductive material. Thus the battery prepared by the SiOx/C material has a significantly improving cycle capacity retention, a significantly reducing expansion rate of the pole piece, and uniform and smooth appearance of the pole piece. In Comparative Example 2, carbon nano-fiber was not added to the coating layer. Although the expansion is reduced, the cycle performance is still poor. Because the conductive network of the material is not complete when carbon nano-fiber is lacking, more capacity loss will occur in the cycling, resulting in poor cycle performance. In Comparative Example 3, flake graphite was not added to the coating layer. Although the cycle performance of the battery is improved, the expansion is still relatively serious. In the absence of the flake graphite, the material being able to relieve the expansion of the material and having conductivity is lack. Thus the expansion relieving capacity of the material is weakened during the cycle, the expansion is still serious.

The applicant declares that the examples described in this specification are intended to explain the present application and that the particular materials, formulation proportions and reaction conditions referred above are nothing more than the specific embodies of the materials, formulation proportions and reaction conditions referred in the present application, and are not intended to further limit the present application, that is, it does not mean that the present application must rely on the detailed methods described above to be implemented. Those skilled in the art should understand that all technical solutions conducted based on the above contents of the present application still belong to the scope of the present application. Any improvement of the present application, equivalent replacement of various raw materials of the product of the present application, and addition of auxiliary ingredients, and selection of specific embodiments fall within the protection scope and disclosure of the present application.

The invention claimed is:

1. A silicon-based anode material, comprising a silicon-based active material and a composite layer coated on the surface of the silicon-based active material, wherein the composite layer comprises a flexible polymer and a conductive material, wherein, the conductive material comprises flake graphite and a nano-carbon based material, wherein the flake graphite is integrally attached to the surface of the silicon-based active material, and the nano-carbon based material fills the region on the surface of the silicon-based active material that is not attached by the flake graphite, and wherein, a contact angle of the silicon-based anode material is ≤60°, wherein the contact angle is tested by the Washburn method.

2. A silicon-based anode material, comprising a silicon-based active material, a conductive material and a flexible polymer, wherein the conductive material and the flexible polymer coat on the surface of the silicon-based active material, and wherein the conductive material comprises flake graphite and a nano-carbon based material, wherein the flake graphite is integrally attached to the surface of the silicon-based active material, and the nano-carbon based material fills the region on the surface of the silicon-based active material that is not attached by the flake graphite, and wherein, a contact angle of the silicon-based anode material is ≤60°, wherein the contact angle is tested by the Washburn method.

3. A silicon-based anode material, comprising a silicon-based active material, a conductive material and a flexible polymer, wherein the conductive material comprises flake graphite and a nano-carbon based material;
the surface of the silicon-based active material attaches with the flake graphite and the nano-carbon based material;
the flexible polymer is bonded between the flake graphite and the nano-carbon based material and/or the flexible polymer is coated on the surface of the flake graphite,
wherein the flake graphite is integrally attached to the surface of the silicon-based active material, and the nano-carbon based material fills the region on the surface of the silicon-based active material that is not attached by the flake graphite, and
wherein, a contact angle of the silicon-based anode material is ≤60°, wherein the contact angle is tested by the Washburn method.

4. The silicon-based anode material according to claim 1, wherein, the flake graphite is uniformly distributed on the surface of the silicon-based active material; and/or
the flake graphite, the nano-carbon based material and the flexible polymer form a continuous coating layer.

5. The silicon-based anode material according to claim 1, wherein, the silicon-based active material has a particle size of 0.5 μm to 100 μm; and/or
the silicon-based active material comprises any one of Si, $SiO_x$, or a silicon alloy, or a combination of at least two thereof, wherein 0<x≤2.

6. The silicon-based anode material according to claim 1, wherein, the flexible polymer comprises a natural flexible polymer and/or a synthetic flexible polymer; and/or
the flexible polymer comprises any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof, and optionally polyolefin and derivatives thereof, a combination of polyolefin and derivatives thereof with alginic acid and derivatives thereof; and/or the flexible polymer has a weight average molecular weight of 2,000-1,000,000; and/or the flexible polymer contains a crosslinking functional group, and the crosslinking functional group comprises any one of epoxy group, carboxyl group, hydroxyl group, amino group, double bond or triple bond, or a combination of at least two thereof; and/or the flexible polymer contains a thermal crosslinking functional group, and the thermal crosslinking functional group comprises any one of epoxy, carboxyl, hydroxyl, amino, double bond or triple bond, or a combination of at least two thereof.

7. The silicon-based anode material according to claim 1, wherein, the flake graphite comprises natural flake graphite and/or synthetic flake graphite; and/or the nano-carbon based material comprises any one of conductive graphite, graphene, carbon nanotubes or carbon nanofibers, or a combination of at least two thereof.

8. The silicon-based anode material according to claim 1, wherein, based on the total mass of the silicon-based active material being 100%, the flexible polymer is present in an amount of 0-10% by mass, exclusive of 0; and/or based on the total mass of the silicon-based active material being 100%, the flake graphite is present in an amount of 0-20% by mass, exclusive of 0; and/or based on the total mass of the silicon-based active material being 100%, the nano-carbon based material is present in an amount of 0-5% by mass, exclusive of 0.

9. The silicon-based anode material according to claim 2, wherein, the silicon-based active material has a particle size of 0.5 μm to 100 μm; and/or the silicon-based active material comprises any one of Si, $SiO_x$, or a silicon alloy, or a combination of at least two thereof, wherein $0<x\leq2$.

10. The silicon-based anode material according to claim 2, wherein, the flexible polymer comprises a natural flexible polymer and/or a synthetic flexible polymer; and/or the flexible polymer comprises any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof, and optionally polyolefin and derivatives thereof, a combination of polyolefin and derivatives thereof with alginic acid and derivatives thereof; and/or the flexible polymer has a weight average molecular weight of 2,000-1,000,000; and/or the flexible polymer contains a crosslinking functional group, and the crosslinking functional group comprises any one of epoxy group, carboxyl group, hydroxyl group, amino group, double bond or triple bond, or a combination of at least two thereof; and/or the flexible polymer contains a thermal crosslinking functional group, and the thermal crosslinking functional group comprises any one of epoxy, carboxyl, hydroxyl, amino, double bond or triple bond, or a combination of at least two thereof.

11. The silicon-based anode material according to claim 2, wherein, the flake graphite comprises natural flake graphite and/or synthetic flake graphite; and/or the nano-carbon based material comprises any one of conductive graphite, graphene, carbon nanotubes or carbon nanofibers, or a combination of at least two thereof.

12. The silicon-based anode material according to claim 2, wherein, based on the total mass of the silicon-based active material being 100%, the flexible polymer is present in an amount of 0-10% by mass, exclusive of 0; and/or based on the total mass of the silicon-based active material being 100%, the flake graphite is present in an amount of 0-20% by mass, exclusive of 0; and/or based on the total mass of the silicon-based active material being 100%, the nano-carbon based material is present in an amount of 0-5% by mass, exclusive of 0.

13. The silicon-based anode material according to claim 3, wherein, the silicon-based active material has a particle size of 0.5 μm to 100 μm; and/or the silicon-based active material comprises any one of Si, $SiO_x$, or a silicon alloy, or a combination of at least two thereof, wherein $0<x\leq2$.

14. The silicon-based anode material according to claim 3, wherein, the flexible polymer comprises a natural flexible polymer and/or a synthetic flexible polymer; and/or the flexible polymer comprises any one of polyolefin and derivatives thereof, polyvinyl alcohol and derivatives thereof, polyacrylic acid and derivatives thereof, polyamide and derivatives thereof, carboxymethyl cellulose and derivatives thereof, or alginic acid and derivatives thereof, or a combination of at least two thereof, and optionally polyolefin and derivatives thereof, a combination of polyolefin and derivatives thereof with alginic acid and derivatives thereof; and/or the flexible polymer has a weight average molecular weight of 2,000-1,000,000; and/or the flexible polymer contains a crosslinking functional group, and the crosslinking functional group comprises any one of epoxy group, carboxyl group, hydroxyl group, amino group, double bond or triple bond, or a combination of at least two thereof; and/or the flexible polymer contains a thermal crosslinking functional group, and the thermal crosslinking functional group comprises any one of epoxy, carboxyl, hydroxyl, amino, double bond or triple bond, or a combination of at least two thereof.

15. The silicon-based anode material according to claim 3, wherein, the flake graphite comprises natural flake graphite and/or synthetic flake graphite; and/or the nano-carbon based material comprises any one of conductive graphite, graphene, carbon nanotubes or carbon nanofibers, or a combination of at least two thereof.

16. The silicon-based anode material according to claim 3, wherein, based on the total mass of the silicon-based active material being 100%, the flexible polymer is present in an amount of 0-10% by mass, exclusive of 0; and/or based on the total mass of the silicon-based active material being 100%, the flake graphite is present in an amount of 0-20% by mass, exclusive of 0; and/or based on the total mass of the silicon-based active material being 100%, the nano-carbon based material is present in an amount of 0-5% by mass, exclusive of 0.

17. The silicon-based anode material according to claim 2, wherein, the flake graphite is uniformly distributed on the surface of the silicon-based active material; and/or the flake graphite, the nano-carbon based material and the flexible polymer form a continuous coating layer.

18. The silicon-based anode material according to claim 3, wherein, the flake graphite is uniformly distributed on the surface of the silicon-based active material; and/or
 the flake graphite, the nano-carbon based material and the flexible polymer form a continuous coating layer.

* * * * *